(12) United States Patent
Kenmotsu

(10) Patent No.: US 8,454,180 B2
(45) Date of Patent: Jun. 4, 2013

(54) MEASURING INSTRUMENT

(75) Inventor: Hiroyoshi Kenmotsu, Shimada (JP)

(73) Assignee: Yazaki Corporation, Tokyo (JP)

( * ) Notice: Subject to any disclaimer, the term of this patent is extended or adjusted under 35 U.S.C. 154(b) by 77 days.

(21) Appl. No.: 13/129,421

(22) PCT Filed: Nov. 19, 2009

(86) PCT No.: PCT/JP2009/069994
§ 371 (c)(1),
(2), (4) Date: May 16, 2011

(87) PCT Pub. No.: WO2010/058864
PCT Pub. Date: May 27, 2010

(65) Prior Publication Data
US 2011/0228512 A1 Sep. 22, 2011

(30) Foreign Application Priority Data

Nov. 19, 2008 (JP) .................................. 2008-295911

(51) Int. Cl.
G01D 11/28 (2006.01)
(52) U.S. Cl.
USPC .................................. 362/23; 362/26; 362/27
(58) Field of Classification Search
USPC .............................. 362/23, 26, 27
See application file for complete search history.

(56) References Cited

U.S. PATENT DOCUMENTS

| 5,741,058 A | 4/1998 | Suzuki et al. |
| 5,915,822 A | 6/1999 | Ogura et al. |
| 6,422,710 B1 | 7/2002 | Herzog et al. |

FOREIGN PATENT DOCUMENTS

| CN | 1271455 A | 10/2000 |
| JP | 2004-354072 A | 12/2004 |
| WO | 9916081 A1 | 4/1999 |

OTHER PUBLICATIONS

International Search Report, dated Feb. 4, 2010, issued in Application No. PCT/JP2009/069994.
Office Action dated Oct. 30, 2012 issued by The State Intellectual Property Office of the People's Republic of China in counterpart Chinese Application No. 200980143853.8.

Primary Examiner — Mary Ellen Bowman
(74) Attorney, Agent, or Firm — Sughrue Mion, PLLC

(57) ABSTRACT

A measuring instrument includes a light source, a dial plate with a scale design, and a light guide member. The light guide member includes a receiving portion for receiving the light from the light source, and a flat plate portion for irradiating the light transmitted from the receiving portion to the dial plate. The flat plane portion includes a thick wall section located close to the scale design, and a thin wall section extending from the thick wall section in a direction away from the light source. The thick wall section is thicker than the thick wall section. A boundary end face connected to a region of the thick wall section and a region of the thin wall section in the second face of the light guide member reflects the light transmitted in the light guide member from the light receiving portion to irradiate the image design.

5 Claims, 7 Drawing Sheets

MEASURING INSTRUMENT

TECHNICAL FIELD

The present invention relates to a measuring instrument.

BACKGROUND ART

FIG. 5 is an exploded perspective view showing a schematic structure of a conventional measuring instrument for a vehicle which is disclosed in Patent Literature 1, FIG. 6 is a plan view showing a light guide member in the measuring instrument which is taken out therefrom, FIG. 7 is a sectional view as seen in a direction of arrow marks VII-VII in FIG. 6, and FIG. 8 is a sectional view as seen in a direction of arrow marks VIII-VIII in FIG. 6.

This measuring instrument for a vehicle is a combination meter in which a speed meter section, a fuel meter section, a water temperature meter section, a gear position section, etc. are integrated, and includes, as shown in FIG. 5, a body case 110, a light guide member 120 which is provided at a surface side of the body case 110, a dial plate 130 which is arranged at a surface side of this light guide member 120, and a pointer 140 which rotates on the surface of this dial plate 130. Moreover, this meter has a movement 150 which is arranged at a back face side of the body case 110 for rotating the pointer 140, a circuit board 160, a light source L which is mounted on the circuit board 160, and so on.

In the speed meter section of the dial plate 130, there are provided a scale design 131 which is formed in a circular arrangement along a rotation direction of the pointer 140, a warning design 133, and so on. These designs 131, 133 are so adapted as to be lit up with an illuminating light from the back face side.

The light guide member 120 mainly illuminates the scale design 131 of the dial plate 130. As shown in detail in FIG. 6, the light guide member 120 has a flat plate portion 121 in a shape of a semicircular disc corresponding to the speed meter section of the dial plate 130, a pointer shaft insertion hole 125 arranged at a center of the semicircular shape, light receiving portions 122 in a shape of conical wall arranged near the pointer shaft insertion hole 125, which will be described below, a through hole 123 provided corresponding to the warning design 133, three triangular holes 126 arranged between the pointer shaft insertion hole 125 and the light receiving portions 122, and light guide paths 127 interposed between two of the three triangular holes 126 thereby to guide the light which has been reflected by the light receiving portions 122 to a reflecting face 129 around the pointer shaft insertion hole 125. The reflecting face 129 around the pointer shaft insertion hole 125 performs a function of lighting up the pointer 140, by introducing an incident light to a light receptive face in a base part of the pointer 140, as its light path is shown in FIG. 8.

The light receiving portion 122 is a part for performing a function of receiving a light from a spot-like light source L (hereinafter referred to as a point light source=LED) which is arranged so as to be opposed to the light receiving face 122a at a back face side thereof, and radially diffusing the light toward the flat plate portion 121. As shown in FIG. 7, the light receiving portion 122 includes a projected part in a truncated conical shape which is projected toward the back face side of the flat plate portion 121, and a recess in a conical shape is concentrically formed inside the truncated conical shape to be dented from a surface side of the flat plate portion 121. In this manner, the light receiving face 122a is formed on a top face of the projected part in the truncated conical shape, and reflecting faces 122b, 122c, 122d, 122e are formed on conical faces outside and inside the projected part. In this prior art, an angle θ1 of an inside conical face and an angle θ2 of an outside conical face are set to be stepwise varied in such a manner that inclination angles of the reflecting faces 122b, 122c, 122d, 122e may approach to that of the flat face plate 121, as approaching to the flat plate portion 121.

Moreover, as shown in FIG. 5, the body case 110 is provided with a light guide member containing part 111 for containing the light guide member 120 at a surface side thereof. Dented parts 112 for containing the light receiving portions 122, a triangular tube part 113 to be fitted to the through hole 123 in the light guide member 120, and a pointer shaft hole 115 for passing the pointer shaft therethrough are formed in the light guide member containing part 111. Then, the back face of the light guide member 120 is contained in the light guide member containing part 111, the light receiving portions 122 of the light guide member 120 are contained in the dented parts 112, and the triangular tube part 113 to which a light of another point light source is introduced is fitted into the through hole 123 in the light guide member 120.

Because the measuring instrument is constructed as described above, the light R1 from the point light source L enters into the light guide member 120 from the light receiving face 122a of the light receiving portion 122, as shown in FIG. 8, and then, radially guided to the flat plate portion 121 sequentially repeating reflections on the reflecting faces 122b, 122c, 122d, 122e, whereby the scale design 131 of the dial plate 130 is illuminated from the back face side.

CITATION LIST

Patent Literature

[PTL 1] JP-A-2004-354072

SUMMARY OF INVENTION

Technical Problem

The above described conventional light guide member 120 is provided with the light receiving portion 122 in a shape of conical wall, and the light from the point light source L is radially diffused from the light receiving portion 122 toward the flat plate portion 121. However, there are some cases where unevenness in brightness and luminance is observed particularly in a peripheral edge part of the flat plate portion 121, and in such cases, it has been desired to improve the light guide member. Also, it is desired that some characters at specified positions in the scale design 131 are brightly illuminated to enhance an appearance of the measuring instrument, and there has been a request to improve the light guide member so that such desire can be realized.

The invention has been made in view of the above described circumstances, and it is an object of the invention to provide a light guide member of a measuring instrument for a vehicle, in which brightness of a peripheral edge part of the light guide member which is particularly important in case of illuminating a scale design can be sufficiently enhanced, and at the same time, unevenness of brightness and luminance can be improved, and to provide the measuring instrument for a vehicle employing the light guide member.

Solution to Problem

In order to achieve the above object, according to the present invention, there is provided a measuring instrument, comprising a light source;

a dial plate which has a scale design; and a light guide member which is provided between the light source and the dial plate, and guides a light received from the light source to the dial plate, wherein the light guide member having a first face that faces to the dial plate and a second face that is opposite to the first face, wherein the light guide member includes a light receiving portion for receiving the light from the light source, and a flat plate portion for irradiating the light transmitted from the light receiving portion to the dial plate;

wherein the scale design is arranged in a circular shape around the light source in view from an opposite side of the light source with respect to the dial plate;

Wherein the flat plane portion includes a thick wall section that is positioned at a vicinity of the scale design, and a thin wall section that is provided so as to be extended from the thick wall section in a direction away from the light source, the thick wall section is greater in thickness than the thin wall section in a direction perpendicular to the dial place; and Wherein a boundary end face which is connected to a region of the thick wall section and a region of the thin wall section in the second face of the light guide member reflects the light transmitted in the light guide member from the light receiving portion to irradiate the scale design.

Preferably, a plane which is defined by the region of the thin wall section in the second face of the light guide member and the boundary end face has a substantially triangular shape. An apex of the substantially triangular shape is set at one position of a peripheral edge of the thick wall section, and a bottom side of the substantially triangular shape is set at a peripheral edge of the thin wail section.

Preferably, a hole in a substantially triangular shape is formed in vicinity of the light receiving portion. One apex of the triangular shape of the hole is positioned between a side of the triangular shape connecting two other apexes and the light source.

Preferably, a hole is formed in the thick wall section of the light guide member, the hole passing through from the first face to the second face of the light guide member. A side face which connects the first face and the second face for defining the hole reflects the light transmitted in the light guide member from the light receiving portion to irradiate the scale design.

According to the light guide member of the measuring instrument having the above structure, the light from the point light source can be radially diffused toward the flat plate portion by the light receiving portion. Moreover, a part of the light diffused in the flat plate portion can be guided to the thin wall section, and at the same time, the remaining light is reflected by the reflecting face defined by the boundary end face, whereby the light can be guided toward the designs on the dial plate which is positioned near the thick wall section. In short, it is possible to increase an amount of the light around the thick wall section by the reflecting face defined by the boundary end face, while an amount of the light in the thin wall section is reduced. As the results, according to specification of the light guide member, a position to be brilliantly illuminated can be easily and brilliantly illuminated, and sensuous unevenness of brightness and luminance can be improved. Moreover, it is possible to regulate unevenness of luminance, by changing a thickness of the thin wall section and an angle of the reflecting face defined by the boundary end face.

According to the light guide member of the measuring instrument having the above structure, it is possible to adjust the brightness around the thick wall section, by appropriately changing the shape of the boundary end face.

According to the light guide member of the measuring instrument for a vehicle having the above structure, it is possible to adjust the brightness around the thick wall section, by appropriately changing the shape of the boundary end face.

Advantageous Effects of Invention

According to the invention, it is possible to sufficiently enhance the brightness in the peripheral edge part of the light guide member which is important particularly in case of illuminating the scale design, and at the same time, it is possible to improve unevenness of brightness and luminance.

The invention has been briefly described, hereinabove. Details of the invention will be further made clear, by reading the "Description of Embodiments" section which will be described below, referring to the attached drawings.

DESCRIPTION OF EMBODIMENTS

Figure 1:
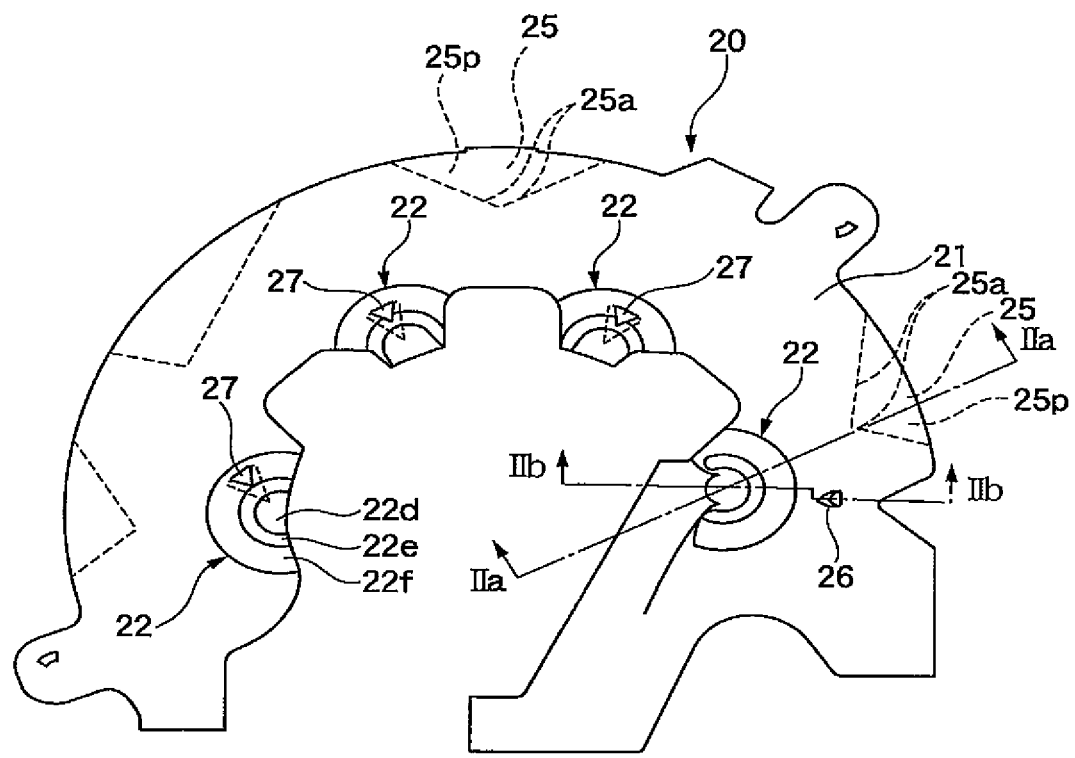
FIG. 1 is a plan view showing a structure of a light guide member in an embodiment of the invention, as seen from a surface side.

Now, a preferred embodiment according to the invention will be described in detail, referring to the drawings.

Figure 2A:
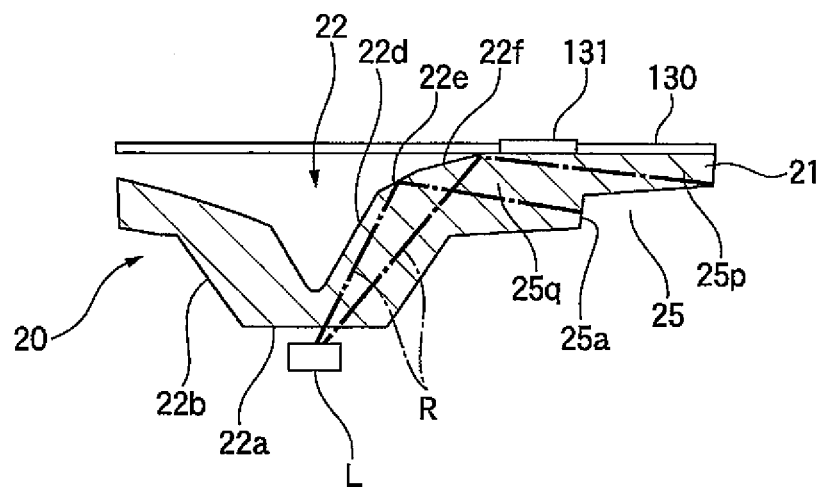
FIG. 2A is a sectional view as seen in a direction of arrow marks IIa-IIa in FIG. 1.
Figure 2B:
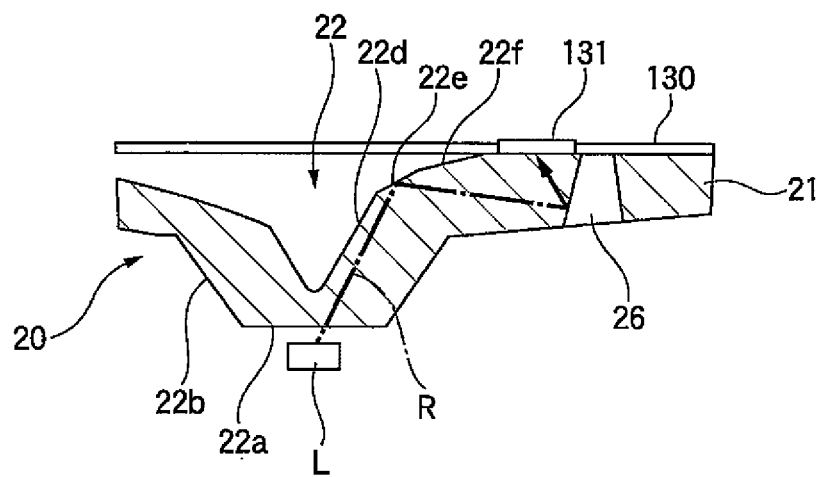
FIG. 2B is a sectional view as seen in a direction of arrow marks IIb-IIb in FIG. 1.
Figure 3A:
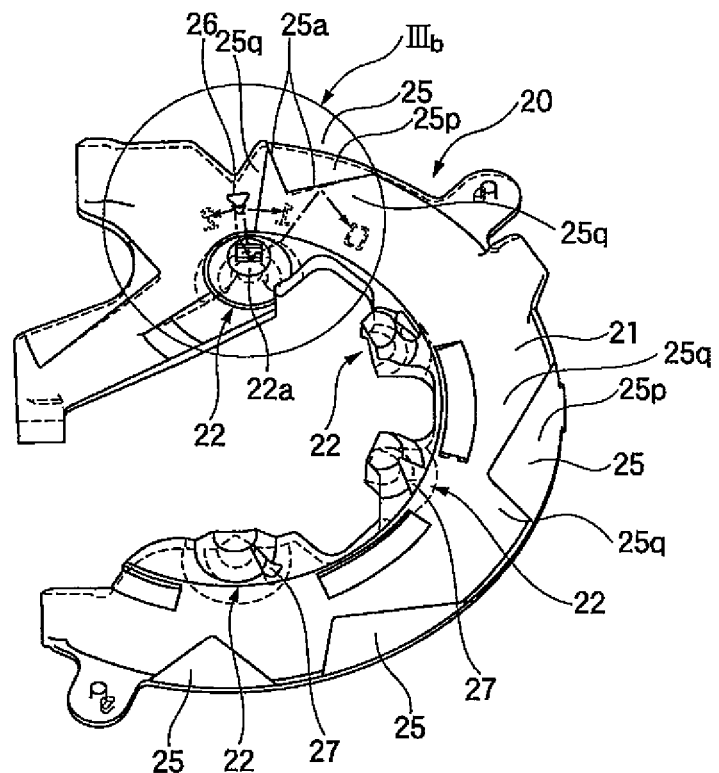
FIG. 3A is a perspective view showing the structure of the light guide member as seen from a back face side.
Figure 3B:
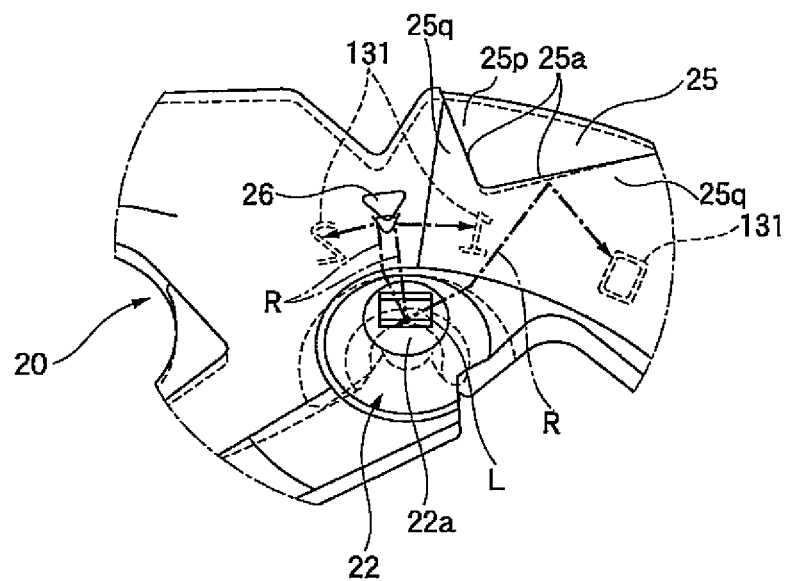
FIG. 3B is an enlarged view of an encircled part IIIb in FIG. 3A.
Figure 4A:
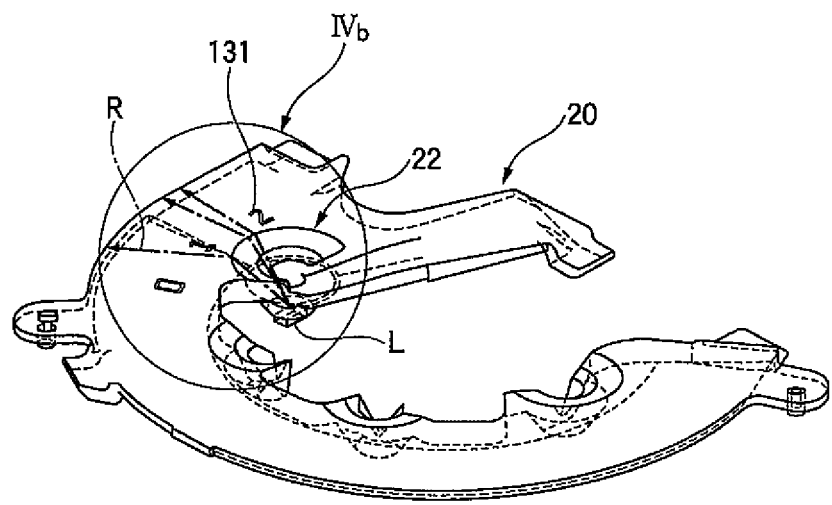
FIGS. 4A and 4B are views showing an advance of a light in case where a triangular hole is not present, FIG. 4A showing a perspective view of the structure of the light guide member as seen from the surface side, and FIG. 4B showing an enlarged view of an encircled part IVb in FIG. 4A.
Figure 4B:
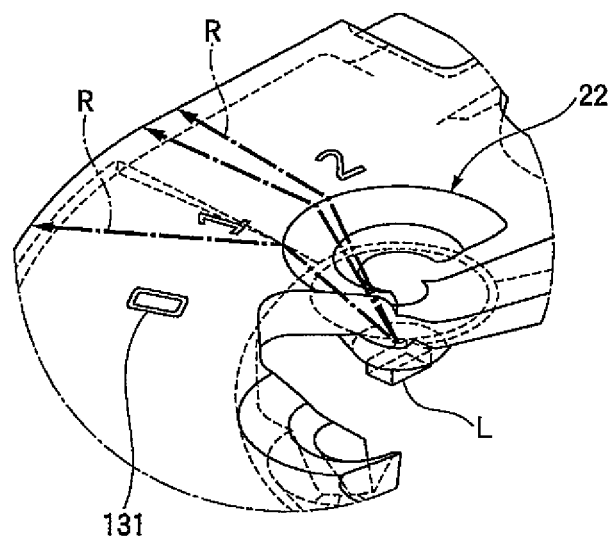

FIG. 1 is a plan view showing a structure of a light guide member as seen from a surface side (a side where a dial plate of a measuring instrument for a vehicle, which will be described below, is positioned), FIG. 2A is a sectional view as seen in a direction of arrow marks IIa-IIa in FIG. 1, FIG. 2B is a sectional view as seen in a direction of arrow marks IIb-IIb in FIG. 1, FIG. 3A is a perspective view of the structure of the light guide member as seen from a back face side (a side where a light source of the measuring instrument for a vehicle, which will be described below, is positioned), FIG. 3B is an enlarged view of an encircled part IIIb in FIG. 3A, FIGS. 4A and 4B are views showing a manner how a light advances in case where a triangular hole is not present. FIG. 4A is a perspective view of the structure of the light guide member as seen from the surface side, and FIG. 4B is an enlarged view of an encircled part IVb in FIG. 4A.

Figure 5:
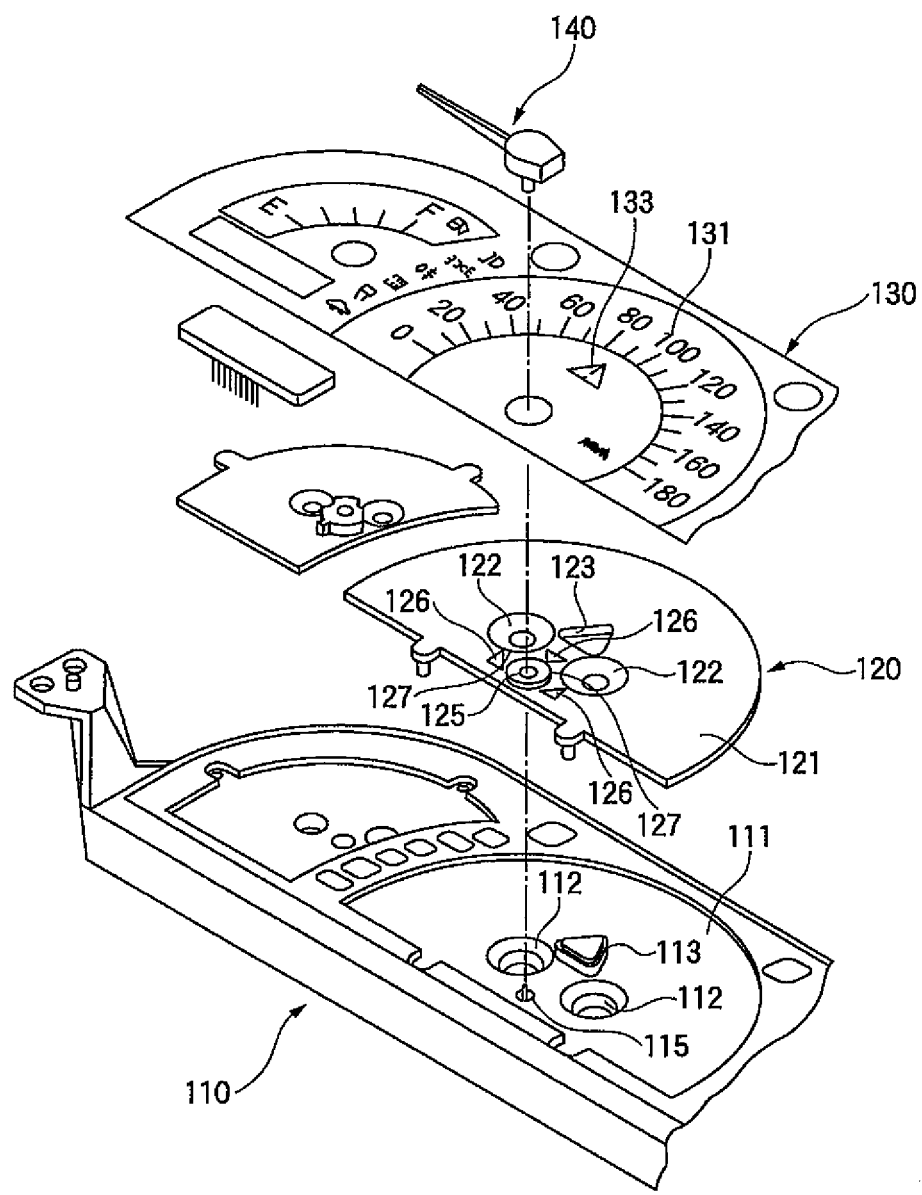
FIG. 5 is an exploded perspective view showing a schematic structure of a conventional measuring instrument for a vehicle which is disclosed in Patent Document 1.
Figure 6:
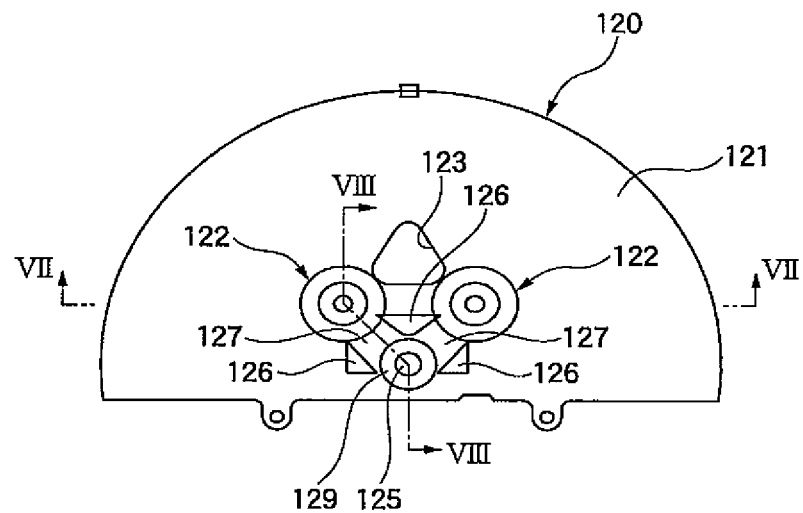
FIG. 6 is a plan view showing a light guide member in the measuring instrument which is taken out therefrom.
Figure 7:
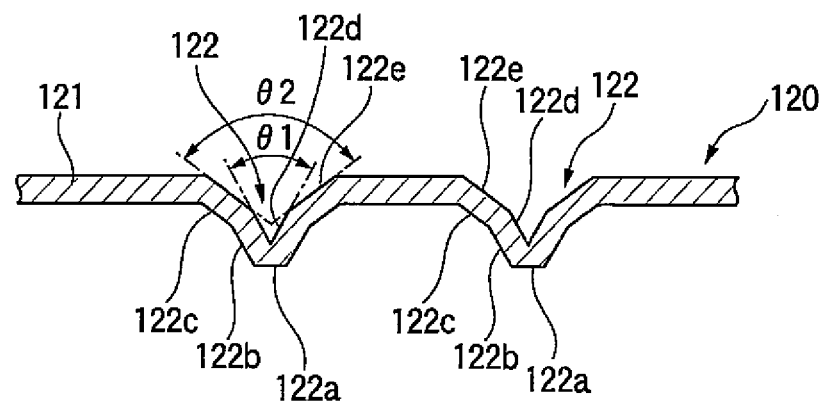
FIG. 7 is a sectional view as seen in a direction of arrow marks VII-VII in FIG. 6.
Figure 8:
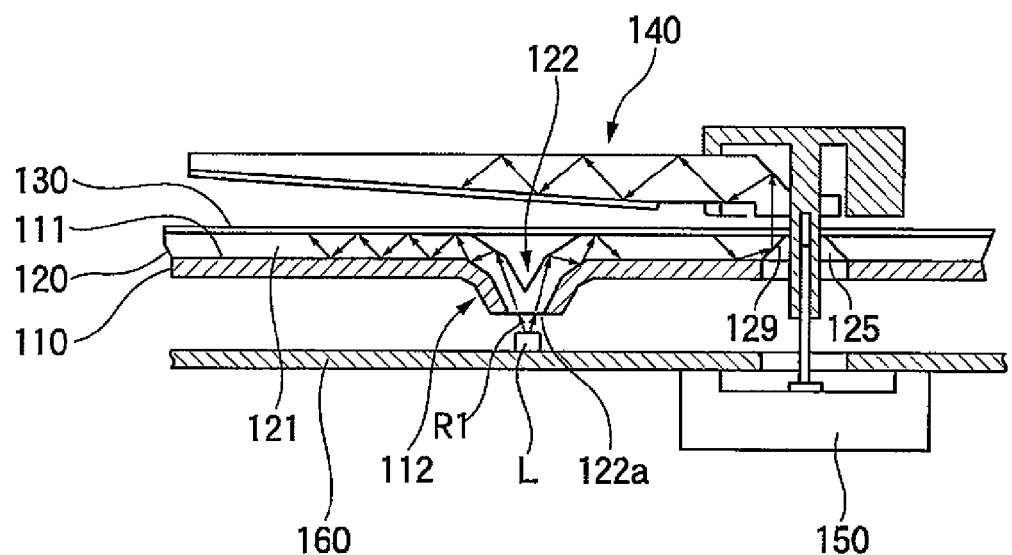
FIG. 8 is a sectional view as seen in a direction of arrow marks VIII-VIII in FIG. 6.

The measuring instrument for a vehicle to which a light guide member 20 is applied is a speed meter section of a combination meter as shown in FIG. 5. The measuring instrument for a vehicle includes a case (not particularly shown), a dial plate 130 (See FIG. 2) provided at a surface side of the case and having a scale design 131 (See FIG. 3) which is arranged in a circular shape around a light source L, a pointer which rotates around the light source L for indicating the scale design 131 in a circular arrangement at the surface side of the dial plate 130, a light guide member which is provided between the case and the dial plate 130, a circuit board which is arranged at a back face side of the case, and a light source L which is mounted on the circuit board for entering an illumination light to a light receiving face of the light guide member through an opening formed in the case. In this description, the light guide member 20 in the embodiment of the invention, which will be described below, is used as the light guide member, and an LED is used as the spot-like light source (a point light source).

As shown in FIGS. 1 and 2, the light guide member 20 is positioned between the light source L and the dial plate 130, and guides a light received from the light source L to the back face of the dial plate 130. The light guide member 20 includes light receiving portions 22 for receiving the light from the point light source L which is arranged so as to be opposed to a light receiving face 22a at a back face side of the light guide member itself, and a flat plate portion 21 in a circular shape which is arranged near a back face of the scale design 131 of the dial plate 130 in a circular arrangement. The light transmitted from the point light source L to the light receiving portions 22 is radially diffused toward the flat plate portion 21, and further, the light traversing the flat plate portion 21 is irradiated to the back face of the dial plate 130. A face of the flat plate portion 21 in contact with the back face of the dial plate is formed as a delustered face, for example, for enabling the light to be easily diffused.

The light receiving portion 22 is arranged on an inner peripheral part of the flat plate portion 21 in a circular shape. As shown in FIG. 2, The light receiving portion 22 has a projected part in a truncated conical shape projected toward the back face side of the flat plate portion 21, and a recess in a conical shape concentrically formed inside the truncated conical shape from a surface side of the flat plate portion 21. The light receiving face 22a is formed on a top face of the projected part in the truncated conical shape, and reflecting faces 22b, 22d, 22e, 22f are formed on conical faces outside and inside the recess. In this embodiment, the outside conical face (the reflecting face 22b) is at a constant angle, but an angle of the inside conical face (the reflecting faces 22d, 22e, 22f) is stepwise varied so as to gradually approach to an angle of the flat plate portion 21.

As shown in FIG. 1, a plurality of the light receiving portions 22 each having the above described structure are provided on an inner periphery of the flat plate portion 21 in the circular shape, at an interval in a circumferential direction. These light receiving portions 22 are formed by cutting off those regions of the flat plate portion 21 in the circular shape which are positioned at the inner peripheral side toward the center, and planes of the regions which have been cut off serve as the reflecting faces 22d, 22e, 22f.

Because the light receiving portion 22 having the above described structure is formed in the light guide member 20, the light from the point light source L is received by the light receiving face 22a of the light receiving portion 22, and radially guided to the flat plate portion 21, while being repeatedly reflected by the reflecting faces 22b, 22d, 22e, 22f. In this manner, the scale design 131 of the dial plate 130 can be illuminated from the back face side.

In this light guide member 20, as shown in FIG. 1 and FIG. 2A, cut-outs 25 in a planar shape are formed in a peripheral edge area of the flat plate portion 21, by cutting off the back face of the flat plate portion 21 toward the peripheral edge area. Consequently, the flat plate portion 21 has thick wall sections 25q which are positioned near the inner periphery of the flat plate portion 21, and thin wall sections 25p having a thinner wall thickness than the thick wall sections and positioned near the outer periphery of the flat plate portion 21. The thick wall sections 25q are positioned near the scale design 131 of the dial plate 130, while the thin wall sections 25p are formed so as to extend from the thick wall sections 25q in a direction away from the point light source L.

Because the thin wall section 25p and the thick wall section 25q are different in thickness from each other, an inclined face is formed in a boundary which connects a back face of the thin wall section 25p and a back face of the thick wall section 25q. This inclined face (sometimes referred to as a boundary end face 25a) serves as a reflecting face for reflecting the light which has been transmitted from the light receiving portion 22 to the thick wall section 25q of the flat plate portion 21. Inclination or a shape of the boundary end face 25a is appropriately designed so that the light reflected by the reflecting face may be favorably irradiated to the scale design. For example, in this embodiment, a plane including the thin wall section 25p and the boundary end face 25a which are formed by the cut-out 25 in the planar shape has a substantially triangular shape, setting an apex at one position of a peripheral edge of the thick wall section 25q, and setting a base at a peripheral edge of the thin wall section 25p. The boundary end face 25a in the triangular shape serves as the reflecting face. In this embodiment, a plurality of the cut-outs 25 as described above are provided on the outer periphery of the flat plate portion 21 at an interval in the circumferential direction.

Moreover, triangular holes 26, 27 are formed in the flat plate portion 21. Inner faces which define the holes 26, 27 serve as reflecting faces for changing a direction of the light which is transmitted through the flat plate portion 21 to other directions. In this case, the hole 26 is formed in a shape of a substantially triangular pyramid in the flat plate portion 21 in such a manner that one apex of a bottom face of the hole 26 in a triangular shape which is formed on the same plane as the back face of the thick wall section 25q so as to be positioned between a bottom side connecting the remaining two apexes of the bottom face of the hole 26 and the point light source L. Moreover, the hole 27 in a substantially triangular shape is formed near the light receiving portion 22 in such a manner that one apex of the triangular shape of the hole 27 is positioned between a side connecting the remaining two apexes and the light source L corresponding to the light receiving portion 22.

According to the light guide member 20 having the above described structure, the light R from the point light source L can be radially diffused to the flat plate portion 21 by the light receiving portion 22. Particularly, because a plurality of the light receiving portions 22 are provided at an interval in the circumferential direction of the flat plate portion 21 in the circular shape, the light can be evenly supplied to an entirety of the flat plate portion 21 in the circular shape. In addition, because those areas of the light receiving portions 22 positioned at the inner peripheral side of the flat plate portion 21 are cut out, the light receiving portions 22 are formed in such a shape that only a part of an angular range in the circumferential direction is left, and the planes which have been cut serve as the reflecting faces. Therefore, most of the light which is reflected toward the inner peripheral side of the flat plate portion 21 can be reflected again to the peripheral edge area of the flat plate portion 21, and hence, it is possible to increase brightness of an object part to be illuminated, while useless light is decreased.

Moreover, a part of the light which is diffused in the flat plate portion 21 can be guided to the thin wall sections 25p, as shown in FIG. 2A, and the remaining light is reflected by the reflecting face defined by the boundary end face 25a, as shown in FIGS. 3A and 3B, whereby the light can be guided toward the design 131.

It is possible to increase an amount of the light in the thick wall section 25q by the reflecting face defined by the boundary end face 25a, while an amount of the light to be transmitted to the thin wall section 25p is reduced. As the results, according to specification (shape, quality of material) of the light guide member 20, a position to be brilliantly illuminated (for example, the position where the design is provided) can be effectively brightly lit up, and sensuous unevenness of brightness and luminance can be improved. Moreover, it is possible to regulate unevenness of luminance, by changing a thickness of the thin wall section 25p and an angle of the reflecting face defined by the boundary end face 25a.

Further, according to this light guide member 20, it is possible to adjust the brightness at a desired position of the dial plate, by appropriately designing a shape of the planar cut-out 25 (a triangular shape in this embodiment), and by adjusting the amount of the light which is reflected by the reflecting face, according to the shape of the cut-out 25.

Still further, according to this light guide member 20, it is possible to convert the light which is advancing in a radial direction inside the light guide member 20 to other directions, due to presence of the holes 26, 27. For example, in case where the holes are not present, as shown in FIG. 4, the light from the light receiving portion 22 advances only to the peripheral edge area of the flat plate portion 21. On the other hand, in case where the hole 26 is present as shown in FIG. 3, the light can be converted to other directions, because the inner face of the hole 26 serves as the reflecting face, and hence, the required scale design can be brightly illuminated.

Particularly, because the holes 26, 27 are formed in a substantially triangular shape in section, the light can be reflected in a plurality of directions, and hence, the required design can be brightly illuminated.

Therefore, by incorporating this light guide member 20 into the measuring instrument, it is possible to brightly illuminate specified portions of the dial plate 130 which are likely to be dark, and hence, it is possible to improve unevenness of the brightness and luminance, and to enhance an appearance.

It is to be noted that the invention is not limited to the above described embodiment, but various modifications, improvements and so on can be appropriately made. Further, material, shape, size, number, positions to be arranged and so on of the respective constituent elements in the above described embodiment are not limited, but can be optionally selected, provided that the invention can be achieved.

The present application is based on Japanese Patent Application No. 2008-295911 filed on Nov. 19, 2008, the contents of which are incorporated herein for reference.

REFERENCE SIGNS LIST

20 Light guide member
21 Flat plate portion
22 Light receiving portion
22a Light receiving face
22b, 22d, 22e, 22f Reflecting face
25a Boundary end face
25p Thin wall section
25q Thick wall section
26, 27 Hole
130 Dial plate
131 Scale design

The invention claimed is:

1. A measuring instrument, comprising
a light source;
a dial plate which has a scale design; and
a light guide member which is provided between the light source and the dial plate, and guides a light received from the light source to the dial plate, wherein the light guide member having a first face that faces to the dial plate and a second face that is opposite to the first face,
wherein the light guide member includes a light receiving portion for receiving the light from the light source, and a flat plate portion for irradiating the light transmitted from the light receiving portion to the dial plate;
wherein the scale design is arranged in a circular shape around the light source in view from an opposite side of the light source with respect to the dial plate;
wherein the flat plate portion includes a thick wall section that is positioned at a vicinity of the scale design, and a thin wall section that is provided so as to be extended from the thick wall section in a direction away from the light source, the thick wall section is greater in thickness than the thin wall section in a direction perpendicular to the dial plate; and
wherein a boundary end face, which is connected to a region of the thick wall section and a region of the thin wall section forming a stepped-shape in the second face of the light guide member, reflects the light transmitted in the light guide member from the light receiving portion to irradiate the scale design.

2. The measuring instrument according to claim 1, wherein a plane which is defined by the region of the thin wall section in the second face of the light guide member and the boundary end face has a substantially triangular shape; and
wherein an apex of the substantially triangular shape is set at one position of a peripheral edge of the thick wall section, and a bottom side of the substantially triangular shape is set at a peripheral edge of the thin wall section.

3. The measuring instrument according to claim 1, wherein a hole in a substantially triangular shape is formed in vicinity of the light receiving portion; and
wherein one apex of the triangular shape of the hole is positioned between a side of the triangular shape connecting two other apexes and the light source.

4. The measuring instrument according to claim 1, wherein a hole is formed in the thick wall section of the light guide member, the hole passing through from the first face to the second face of the light guide member; and
wherein a side face which connects the first face and the second face for defining the hole reflects the light transmitted in the light guide member from the light receiving portion to irradiate the scale design.

5. The measuring instrument according to claim 1, wherein the boundary end face is substantially perpendicular to at least one of the thick wall section and the thin wall section.

* * * * *